(12) United States Patent
Grywacheski et al.

(10) Patent No.: US 7,726,111 B2
(45) Date of Patent: Jun. 1, 2010

(54) SUSPENSION SYSTEM FOR A BELT PICKUP HEADER IN AN AGRICULTURAL HARVESTER

(75) Inventors: Sheldon Joseph Grywacheski, Humboldt (CA); Nelson John Klapak, Humboldt (CA); Leslie Gregory Hill, Humboldt (CA); Derek Stanley Rude, Muenster (CA); Jobey Mathew Schnepf, Davenport, IA (US)

(73) Assignee: Deere & Company, Moline, IL (US)

( * ) Notice: Subject to any disclaimer, the term of this patent is extended or adjusted under 35 U.S.C. 154(b) by 775 days.

(21) Appl. No.: 11/442,101

(22) Filed: May 26, 2006

(65) Prior Publication Data

US 2007/0000226 A1   Jan. 4, 2007

Related U.S. Application Data

(60) Provisional application No. 60/695,652, filed on Jun. 30, 2005.

(51) Int. Cl.
*A01D 43/00* (2006.01)
(52) U.S. Cl. ...................................................... 56/364
(58) Field of Classification Search .................. 56/394, 56/12.6, 15.3–16.2, 208, 344–364, 397, DIG. 3, 56/DIG. 10, DIG. 11
See application file for complete search history.

(56) References Cited

U.S. PATENT DOCUMENTS

| | | | | |
|---|---|---|---|---|
| 2,774,447 A | * | 12/1956 | Bourcier De Carbon | 188/269 |
| 2,795,100 A | * | 6/1957 | Sund | 56/364 |
| 3,361,444 A | * | 1/1968 | Harbers | 280/790 |
| 3,474,605 A | | 10/1969 | Resetich | 56/27 |
| 3,619,996 A | * | 11/1971 | Jacobson et al. | 56/13.6 |
| 3,628,317 A | * | 12/1971 | Lederer | 56/219 |
| 3,717,995 A | * | 2/1973 | Case | 60/470 |
| 3,771,302 A | | 11/1973 | Vogt | 56/364 |
| 4,171,606 A | | 10/1979 | Ziegler et al. | 56/10.2 |
| 4,304,089 A | | 12/1981 | Mescheryakov et al. | 56/364 |
| 4,332,126 A | | 6/1982 | Van Auwelaer et al. | 56/10.2 |
| 4,353,201 A | * | 10/1982 | Pierce et al. | 56/364 |
| 4,453,375 A | * | 6/1984 | Field | 56/364 |
| 4,527,381 A | * | 7/1985 | Mann | 56/209 |
| 4,567,719 A | | 2/1986 | Soots et al. | 56/364 |
| 4,841,718 A | * | 6/1989 | Sund | 56/364 |
| 4,864,805 A | * | 9/1989 | Hager et al. | 56/11.9 |
| 4,934,733 A | * | 6/1990 | Smith et al. | 280/124.132 |
| 4,970,849 A | * | 11/1990 | Friesen | 56/12.4 |
| 5,082,326 A | * | 1/1992 | Sekido et al. | 297/284.6 |
| 5,090,187 A | * | 2/1992 | Mews | 56/364 |
| 5,136,832 A | * | 8/1992 | Sund | 56/364 |
| 5,375,767 A | * | 12/1994 | Thorstensson | 239/164 |
| 5,964,077 A | * | 10/1999 | Guinn | 56/10.2 E |

(Continued)

*Primary Examiner*—Thomas B Will
*Assistant Examiner*—Joan D Misa
(74) *Attorney, Agent, or Firm*—Taylor & Aust, P.C.

(57) ABSTRACT

A belt pickup header for an agricultural harvesting machine includes a frame having opposite ends, a belt pickup carried by the frame, and a pair of suspension arms carrying the belt pickup. Each suspension arm is pivotally coupled with a respective frame end. A pair of compression springs are each positioned between a respective suspension arm and corresponding frame end. Each spring vertically supports a respective suspension arm. A pair of fluid shocks are each interconnected between a respective suspension arm and corresponding frame end. Each fluid shock damps movement of the corresponding suspension arm.

18 Claims, 6 Drawing Sheets

U.S. PATENT DOCUMENTS

| | | | |
|---|---|---|---|
| 5,983,615 A | 11/1999 | Schmid et al. | 56/208 |
| 6,050,075 A | 4/2000 | Waldrop | 56/364 |
| 6,138,447 A * | 10/2000 | Stivers et al. | 56/221 |
| 6,170,244 B1 * | 1/2001 | Coers et al. | 56/226 |
| 6,212,865 B1 * | 4/2001 | Peeters et al. | 56/366 |
| 6,340,165 B1 * | 1/2002 | Kelderman | 280/124.153 |
| 6,594,980 B2 * | 7/2003 | Oka et al. | 56/15.8 |
| 6,758,029 B2 | 7/2004 | Beaujot | 56/10.2 |
| 6,945,548 B2 * | 9/2005 | Dudding et al. | 280/124.157 |
| 2006/0277889 A1 * | 12/2006 | Sheedy et al. | 56/364 |
| 2008/0263990 A1 * | 10/2008 | Morelli et al. | 52/650.3 |

* cited by examiner

SUSPENSION SYSTEM FOR A BELT PICKUP HEADER IN AN AGRICULTURAL HARVESTER

CROSS REFERENCE TO RELATED APPLICATIONS

This is a non-provisional application based upon U.S. provisional patent application Ser. No. 60/695,652, entitled "SUSPENSION SYSTEM FOR AGRICULTURAL HARVESTER BELT PICKUP, filed Jun. 30, 2005.

FIELD OF THE INVENTION

The present invention relates to a pickup header for an agricultural harvester, and, more particularly, to a suspension system for such a pickup header.

BACKGROUND OF THE INVENTION

An agricultural harvesting machine such as a combine includes a header and a feeder housing which remove the crop material from the field, gather the crop material and transport the crop material to a separator. The grain is cleaned and deposited in a grain tank. When the grain tank becomes full, an unloading auger which is positioned alongside the combine during harvesting is moved to the unloading position in which the auger extends approximately perpendicular to the longitudinal axis of the combine. The combine drives alongside a vehicle into which the grain is to be unloaded, such as a semi-trailer, and the unloading auger is actuated to discharge the grain into the vehicle.

For small stemmed crops such as wheat, soybeans, etc., the combine typically carries and drives a header, in this instance also known as a cutting platform, with a sickle bar cutter at the leading edge of the platform. The crop is cut using the sickle bar cutter and conveyed to the feeder housing of the combine using suitable conveying structures such as an overhead reel, draper belts or dual feed auger, etc.

For certain applications and operating environments, the crop is cut prior to full maturation and dry down, and allowed to dry in the field prior to being picked up and processed with a combine. A crop which is processed too green is hard on the internal workings of the combine and also results in high drying costs to reduce the crop moisture level to a target level.

For example, in western Canada a fair amount of cereal grain is grown where the growing seasons are typically too short to allow full maturation and dry down. It is thus common practice to first cut the cereal grain with a sickle bar cutter in windrows. The cereal grain is allowed to dry in the windrows and is subsequently picked up using a pickup header carried by the combine. A cutting platform with a sickle bar cutter as described above is not suitable for this type harvesting practice.

One type of known pickup header is a belt pickup header, including one or more belts which are carried by generally horizontally positioned drive and idler rollers. The belt(s) convey the crop material rearwardly to the feeder housing of the combine.

A belt pickup header can experience large and abrupt vertical motion when exposed to rough terrain or rough fields. The belt pickup is typically cantilevered in front of the header frame, which is itself cantilevered from the forward extending feeder housing on the front of the combine. Fast transportation speeds and rough road terrain can cause significant movement of the pickup belt header and in extreme situations, result in mechanical failure. Rough or uneven field terrain can also cause the belt pickup to lift off the ground and miss crop.

During transportation, at speeds higher than field operation, bumps or dips in the road terrain can result in the belt pickup being thrown vertically into the air resulting in damage to the belt pickup or to the header frame due to the abrupt stopping at the upper or lower stops. Thus, suspension is necessary for efficient and safe field operation and transportation of a belt pickup platform. During harvesting operation, the forward end of the belt pickup must follow the ground quite closely. Belt pickup headers are provided with a pair of wide-spaced gauge wheels running just ahead and outside of the forward portion of the belt pickup. The belt pickup is free to pivot relative to the header frame about a generally horizontal axis. A pair of tension springs extend at a downwardly angled orientation between the header frame and each respective end of the belt pickup to support the belt pickup when the header is raised, such as during road transport or at the ends of the windrows.

What is needed in the art is a suspension system for a belt pickup header which better vertically supports and damps movement of the belt pickup.

SUMMARY OF THE INVENTION

The present invention provides a suspension system for a belt pickup header including a compression spring for vertically supporting the belt pickup header and a fluid shock for damping movements of the belt pickup header.

The invention comprises, in one form thereof, a belt pickup header for an agricultural harvesting machine, including a frame having opposite ends, a belt pickup carried by the frame, and a pair of suspension arms carrying the belt pickup. Each suspension arm is pivotally coupled with a respective frame end. A pair of compression springs are each positioned between a respective suspension arm and corresponding frame end. Each spring vertically supports a respective suspension arm. A pair of fluid shocks are each interconnected between a respective suspension arm and corresponding frame end. Each fluid shock damps movement of the corresponding suspension arm.

The invention comprises, in another form thereof, a method of operating a belt pickup header attached to an agricultural harvester, including the steps of: suspending a belt pickup from a frame of the belt pickup header using a pair of suspension arms; positioning the suspension arms at a desired operating height relative to the frame using a pair of compression springs respectively located between each suspension arm and the frame; and damping movement of the suspension arms using a pair of fluid shocks, with each fluid shock coupled with the frame and associated with a respective suspension arm.

DETAILED DESCRIPTION OF THE INVENTION

Figure 1:
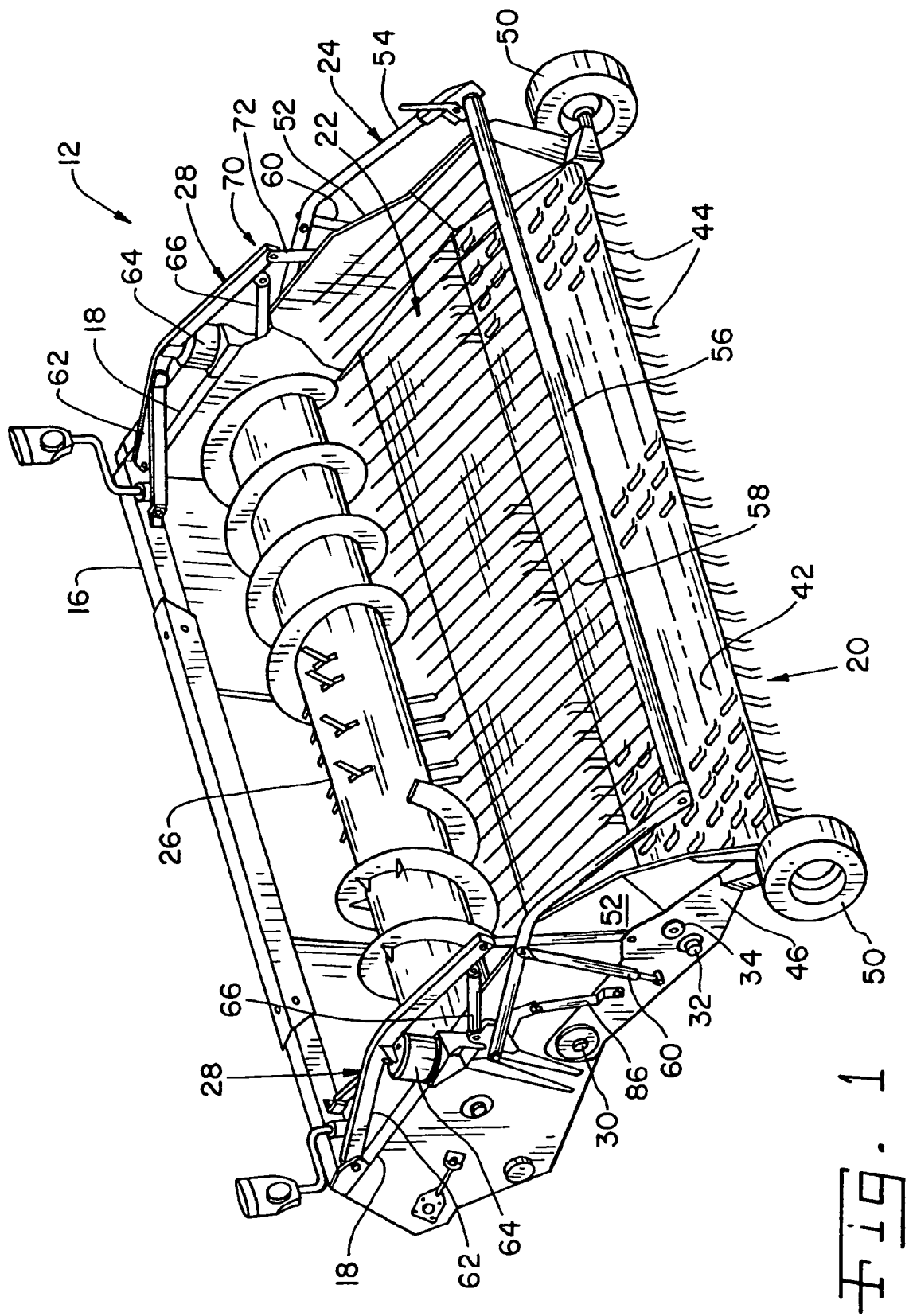
FIG. 1 is a front perspective view of a belt pickup header including an embodiment of a suspension system of the present invention.
Figure 2:
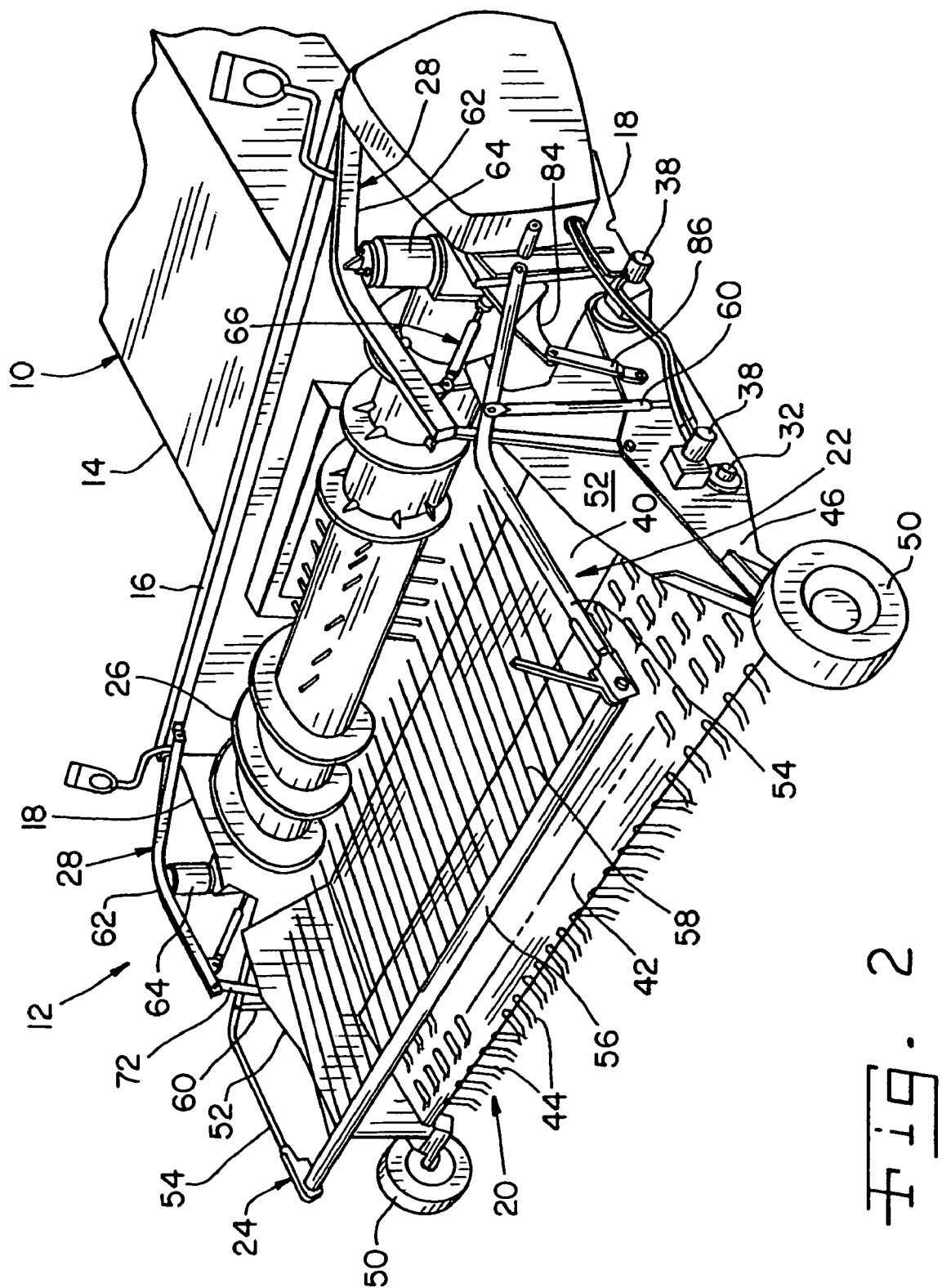
FIG. 2 is another perspective view of the belt pickup header shown in FIG. 1.
Figure 3:
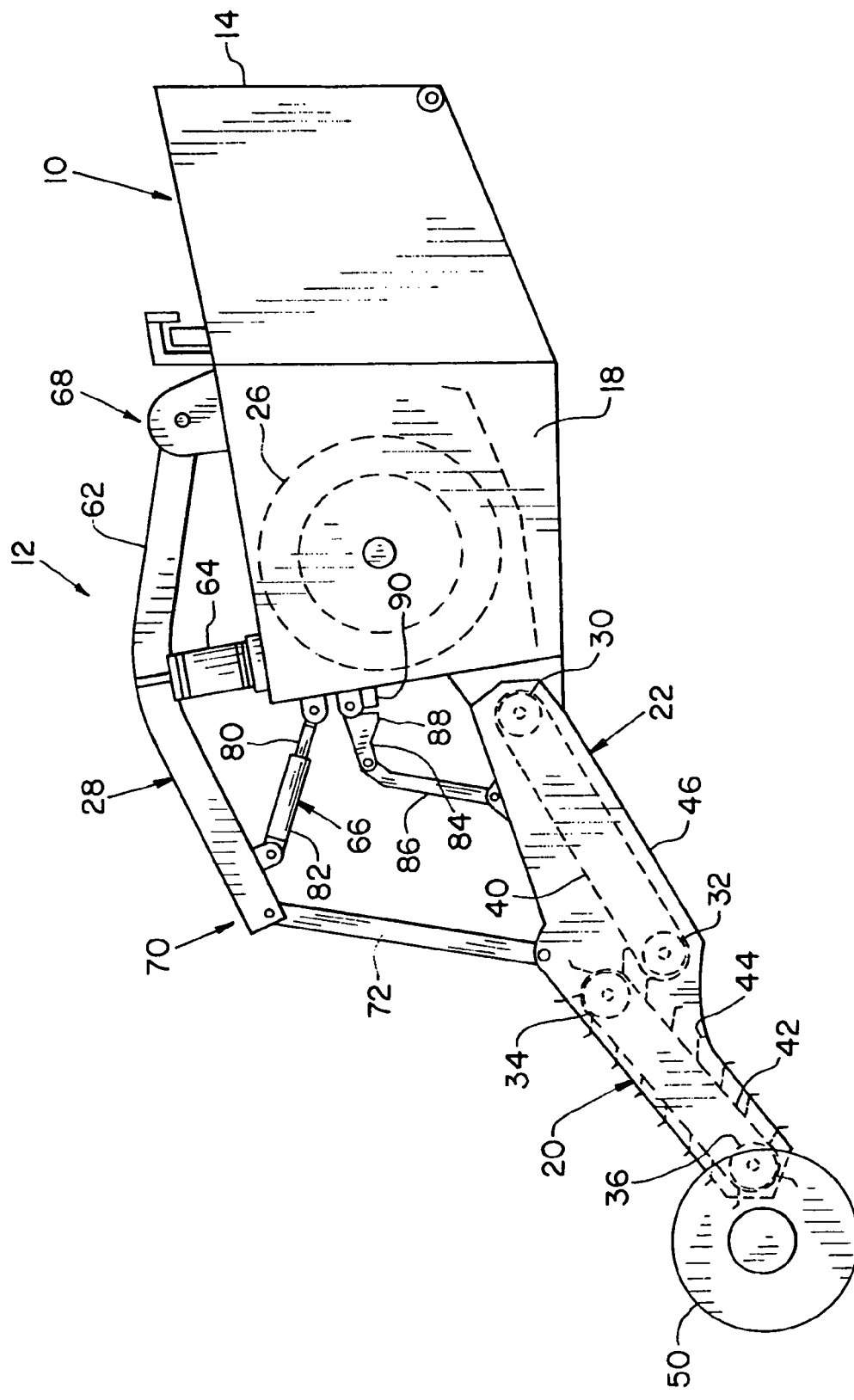
FIG. 3 is a fragmentary, side schematic view showing details of the suspension system shown in FIGS. 1 and 2.
Figure 4:
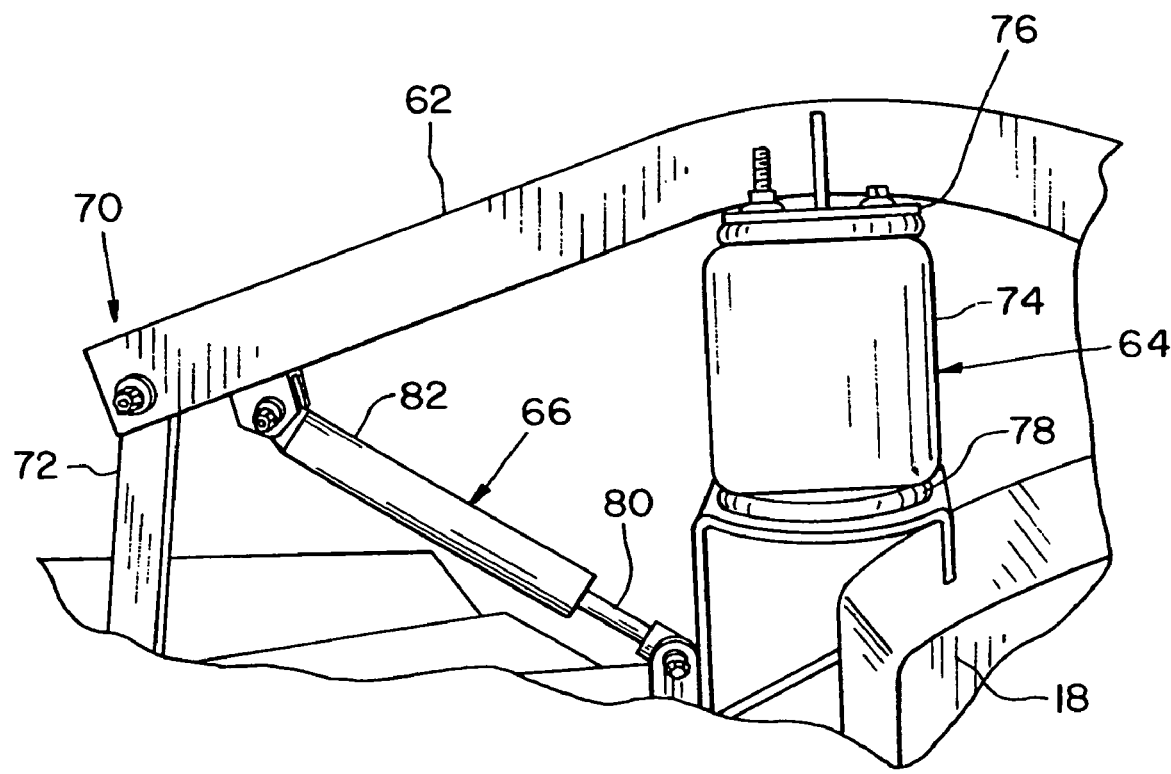
FIG. 4 is fragmentary perspective view showing the air spring and shock.
Figure 5:
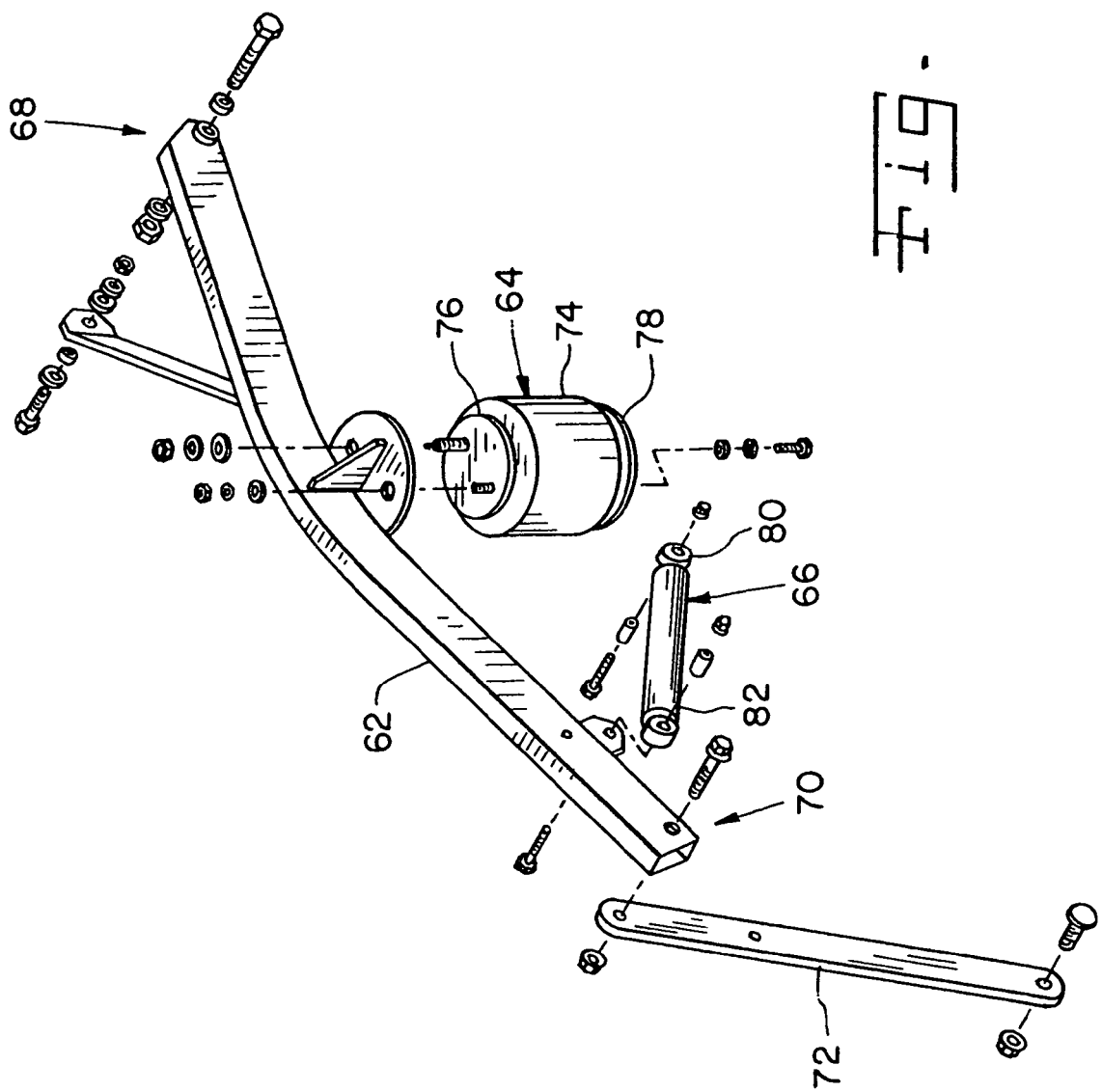
FIG. 5 is an exploded, perspective view of the components of the suspension system.

Referring now to the drawings, and more particularly to FIGS. 1-3, there is shown a portion of an agricultural harvesting machine in the form of a combine 10 which is coupled with an embodiment of a belt pickup header 12 of the present invention. Belt pickup header 12 is coupled with combine 10 in a suitable manner, such as by using one or more drive shafts, hydraulic hoses, etc. Crop material, including grain crop material and non-grain crop material, is picked up from a field using belt pickup header 12 and conveyed to feeder housing 14 of combine 10 for subsequent processing within combine 10.

Belt pickup header 12 generally includes a frame 16 having a pair of frame ends 18, belt pickup 20, transfer belt assembly 22, windscreen 24 (also known as a crop hold-down), dual feed auger 26, and suspension system 28.

Transfer belt assembly 22 includes a drive roller 30 and a driven roller 32 (FIG. 3). Drive roller 30 also defines the point of pivotal coupling between transfer belt assembly 22 and frame 16. Similarly, belt pickup 20 includes a drive roller 34 and a driven roller 36. As shown in FIG. 2, drive roller 30 and drive roller 34 are respectively driven by a pair of hydraulic motors 38 which are coupled together in series so as to drive transfer belt assembly 22 and belt pickup 20 at the same rotational speed. Transfer belt assembly 22 includes a belt 40 which is smooth in the embodiment shown, but may also include cleats if desirable for conveying the crop material toward combine 10. Belt pickup 20 includes a belt 42 carrying a plurality of tines 44 for effectively removing the crop material from the field.

Belt pickup 20 and transfer belt assembly 22 include a common end plate 46 defining suitable structure for carrying drive and driven rollers 30, 32 and 34, 36. Additionally, end plate 46 carries a pair of gauge wheels 50 positioned just slightly forward and outside of belt pickup 20. An additional pair of shields 52 as shown in FIGS. 1 and 2 may be provided adjacent end plates 46 to assist in directing the crop material rearwardly toward combine 10.

Windscreen 24 includes a pair of arms 54 interconnected by a cross bar 56. Cross bar 56 carries a plurality of rearwardly extending tines 58. The angular orientation of tines 58 may be adjusted manually by adjusting the attachment orientation between cross bar 56 and arms 54. A pair of series connected hydraulic cylinders 60 interconnect arms 54 with end plates 48 of transfer belt assembly 22 (the hoses coupled with cylinders 60 are not shown for simplicity). The vertical height of cross bar 56 and tines 58 may be adjusted by an operator through actuation of hydraulic cylinders 60. By connecting the lower end of hydraulic cylinders 60 with end plates 48 (or optionally end plates 46 of belt pickup 20), cross bar 56 moves up and down with belt pickup 20 to provide a substantially constant clearance distance therebetween for rearward conveying of crop material.

Dual feed auger 26, in known manner, receives the crop material conveyed rearwardly by transfer belt assembly 22 and moves the crop material inward from each end of belt pickup header 12 toward feeder housing 14.

Suspension system 28 generally includes a pair of suspension arms 62, a pair of compression springs 64, and a pair of fluid shocks 66. Each suspension arm 62 has a proximal end closest to combine 12 which is pivotally coupled with frame 16 at the opposite ends of belt pickup header 12. In the embodiment shown, each suspension arm 62 has a proximal end 68 which is pivotally coupled with frame ends 18 of frame 16. Each suspension arm 62 has a distal end 70 which is coupled with an end plate 46 at each end of belt pickup 20. In the embodiment shown, each suspension arm 62 has a distal end 70 which is coupled with a respective end plate 46 by way of a corresponding suspension link 72 in a manner allowing free pivotal movement therebetween. Alternatively, it may be possible to form each suspension arm 62 so as to angle downwardly for direct connection with the trailing edge of belt pickup 20 or the leading edge of transfer belt assembly 22.

Each compression spring 64 is illustrated as an air spring in the embodiment shown in the drawings. Each air spring 64 includes a bladder 74 coupled with a pair of end plates 76 and 78. Bladder 74 is constructed from a suitable elastomeric material having a suitable wall thickness, etc. to support a portion of the weight of belt pickup 20 and transfer belt assembly 22 carried by suspension links 72. Top end plate 76 is a metal end plate allowing attachment with a corresponding suspension arm 62. Each end plate 76 also carries an air valve allowing air to be selectively added to or removed from bladder 74 to obtain a desired operating pressure. The air pressure within each bladder 74 controls the operating height of each suspension arm 62, and in turn the angular attitude of belt pickup 20 during harvesting operation.

Fluid shocks 66 damp movement between suspension arms 62 and frame 16. Each fluid shock 66, configured as hydraulic shocks in the embodiment shown, are passive shocks having one end coupled with frame 16. An opposite end of each fluid shock 66 extends in an angularly upward direction and couples with a corresponding suspension arm 62. Each fluid shock 66 includes a ram 80 slidable within a cylinder 82. Each ram 80 defines an upper travel limit of suspension arm 62 and belt pickup 20 when ram 80 is at a fully extended position.

Although each fluid shock 66 is configured as a hydraulic shock in the embodiment shown in the drawings and described above, it is also possible to configure each fluid shock as a gas shock for suitable applications. Additionally, although each fluid shock 66 is shown as interconnecting between frame 16 and a suspension arm 62, it is also possible for fluid shocks 66 to interconnect between frame 16 and belt transfer assembly 22 or belt pickup 20.

A lower travel limit of belt pickup 20 and transfer belt assembly 22 relative to frame 16 is defined by a pair of two bar linkages at either end of transfer belt assembly 22, including an upper link 84 and lower link 86. Each upper link 84 has a projection 88 which engages a mechanical stop 90 on frame 16 and limits the downward motion of belt pickup 20 and transfer belt assembly 22 relative to frame 16. Of course, the exact configuration for a mechanical stop associated with upper link 84 and lower link 86 may vary, depending upon the application. Further, it may be possible to configure lower link 86 for connection with an end plate 46 at the trailing end of belt pickup 20, rather than for connection with an end plate 46 at transfer belt assembly 22.

In the embodiment of suspension system 28 shown and described above, each compression spring 64 is configured as an air spring. However, it is also be understood that compression spring 64 may be configured as a mechanical coil spring or a hydraulic spring. In the event of a coil spring, the upper end of each coil spring could be directly attached to a corresponding suspension arm, as described above with regard to the air spring. In the case of a hydraulic compression spring, a one-way hydraulic cylinder can mechanically interconnect between a respective frame end 18 and suspension arm 62. Each hydraulic cylinder would be fluidly connected with a hydraulic accumulator (e.g., a piston or bladder type accumulator). The lifting force exerted on each suspension arm 62 may be adjusted by adjusting the pressure within the hydraulic accumulator and thereby adjusting the lifting force of each hydraulic cylinder.

During harvesting operation, raising belt pickup header 12 allows belt pickup 20 to pivot downwards increasing its pitch; and lowering belt pickup header 12 decreases pitch. In normal crop conditions, with the crop windrow lying on top of the stubble and off the ground, good results are obtained with a pitch such that the delivery run of the belt is approximately horizontal or parallel with the ground providing direct and positive feeding of belt pickup header 12. Other crop and ground conditions make it desirable to run belt pickup 20 at pitches both flatter and steeper than normal. For example, in a poor windrow condition with the windrow embedded in the stubble, a decreased pitch may be necessary. In rocky conditions, a steeper pitch may prevent rocks from being carried by the belt into the platform auger. Other positions give operating attitude ranges corresponding to flatter pitch and steeper pitch of belt pickup 20, corresponding to relatively lower and higher positions of belt pickup header 12.

Productive and efficient gathering of crop material from a field depends on controlling the height of the front of the belt pickup and keeping the forward roller parallel to the ground. Since the rear of belt pickup header 12 is mounted to feeder housing 14 of combine 10, a mechanism is provided for pivotal movement of both the belt pickup and belt transfer assembly relative to header frame 16. Control of this movement is achieved using suspension system 28 for the cantilevered structure of belt pickup 20.

Suspension system 28 works effectively even when uneven ground results in severe vertical deflection of belt pickup 20. For example, when uneven ground causes the front portion of belt pickup 20 to be raised, air spring 64 allows suspension arms 62 to pivot upwards. However, there is a reduced relative damping movement of suspension arms 62 using fluid shocks 66. Thus, the suspension motion reducing feature ensures that there is no severe or abrupt mechanical stopping.

Thus, it is seen that the combination of a compact air spring and easily mounted fluid shock, both carried on the header frame, provides a suspension response which maintains a preselected attitude of the belt pickup but which takes account of undulating ground conditions. When conditions cause vertical deflection of the belt pickup, the suspension system controls the relative vertical motion of the belt pickup. The suspension system is simple and low in manufacturing cost, easy to assemble and readily accessible for service or adjustment.

Figure 6:
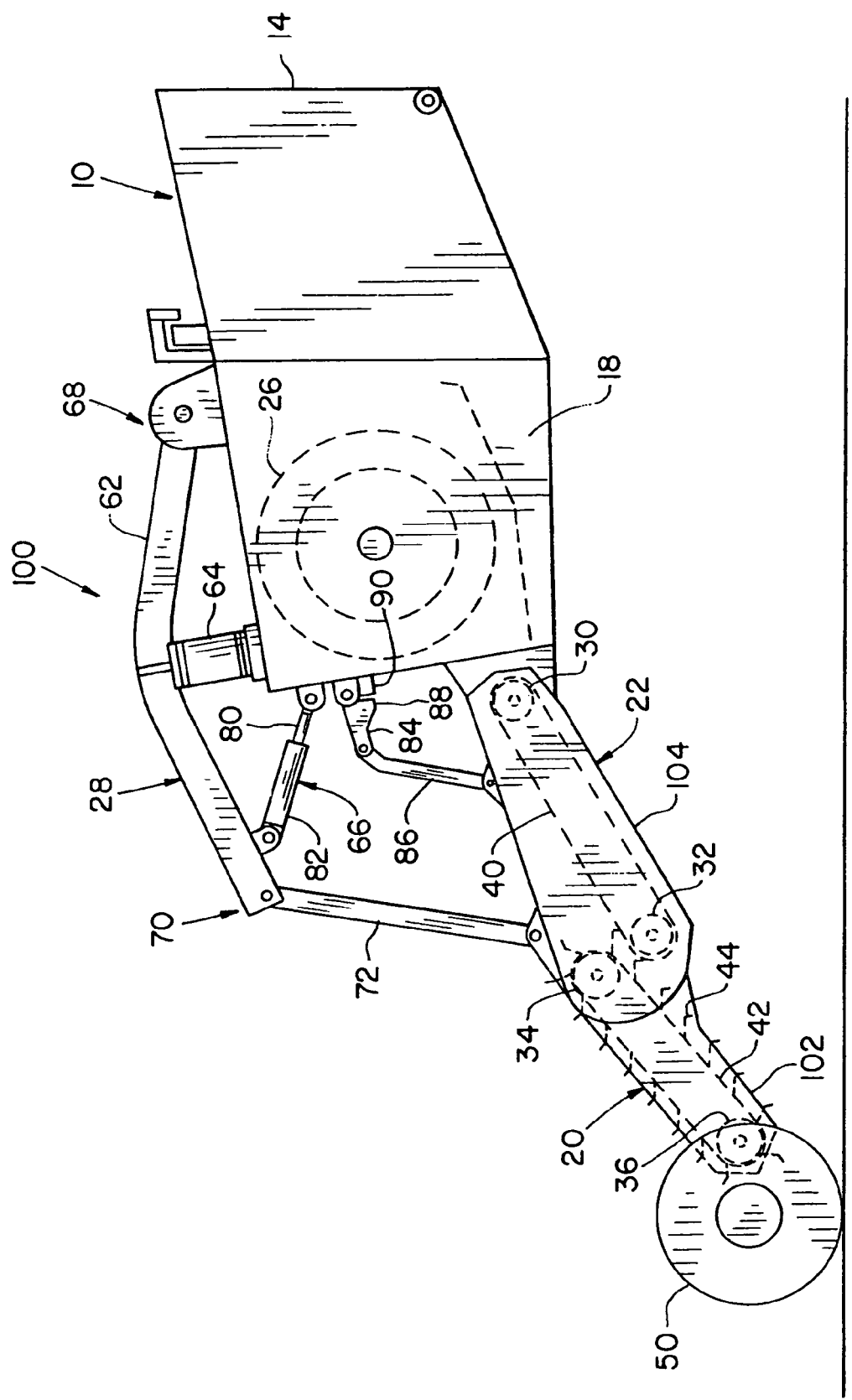
FIG. 6 is a fragmentary, side schematic view showing details of another embodiment of a suspension system of the present invention.

Referring now to FIG. 6, another embodiment of a belt pickup header 100 of the present invention is shown. Belt pickup header 100 is similar to belt pickup header 12 in many respects, with a primary difference being that belt pickup 20 includes a first pair of end plates 102 at each end thereof, and transfer belt assembly 22 includes a second pair of end plates 104 at each end thereof. Drive roller 34 of belt pickup 20 defines an axis of pivotal coupling between belt pickup 20 and transfer belt assembly 22. End plates 102 and 104 define suitable structure for carrying drive and driven rollers 30, 32 and 34, 36. Additionally, end plates 102 of belt pickup 20 carry gauge wheels 50 positioned just slightly forward and outside of belt pickup 20.

Having described the preferred embodiment, it will become apparent that various modifications can be made without departing from the scope of the invention as defined in the accompanying claims.

The invention claimed is:

1. A belt pickup header for an agricultural harvesting machine, comprising:
   a frame having spaced opposite ends;
   a belt pickup carried by said frame;
   a pair of suspension arms carrying said belt pickup, each said suspension arm pivotally coupled with a respective said frame end, each said suspension arm including a proximal end pivotally coupled with said corresponding frame end, and a distal end coupled with said belt pickup;
   a pair of suspension links, each said suspension link interconnected between a corresponding said suspension arm distal end and said belt pickup and wherein said belt pickup includes a trailing edge and further including a transfer belt assembly adjacent said trailing edge, each said suspension link coupled with said belt pickup adjacent said trailing edge;
   a pair of lower travel limit linkages, each said lower travel limit linkage interconnected between a corresponding said frame end and said transfer belt assembly;
   a pair of compression springs, each said spring positioned between a respective said suspension arm and corresponding said frame end, each said compression spring vertically supporting said respective suspension arm; and
   a pair of fluid shocks, each said fluid shock interconnected between a respective said suspension arm and corresponding said frame end, each said fluid shock damping movement of said corresponding suspension arm substantially between its range of movement.

2. The belt pickup header of claim 1, wherein each said compression spring comprises one of an air spring, a coil spring and a hydraulic spring.

3. The belt pickup header of claim 2, wherein each said compression spring comprises an air spring including a bladder coupled with a pair of end plates, one said end plate engaged with said corresponding frame end, and an other said end plate coupled with said corresponding suspension arm.

4. The belt pickup header of claim 3, wherein each said air spring includes an air valve.

5. The belt pickup header of claim 2, wherein each said compression spring vertically supports said corresponding suspension arm at a selected height.

6. The belt pickup header of claim 5, wherein each said compression spring is adjustable.

7. The belt pickup header of claim 1, wherein each said fluid shock comprises one of a hydraulic shock and a gas shock.

8. The belt pickup header of claim 7, wherein each said fluid shock includes a ram defining an upper travel limit of said belt pickup.

9. The belt pickup header of claim 1, wherein each said lower travel limit linkage comprises a two bar linkage.

10. A belt pickup header for an agricultural harvesting machine, comprising:
    a frame having spaced opposite ends;
    a belt pickup carried by said frame, said belt pickup including a trailing edge;
    a transfer belt assembly adjacent said trailing edge; a pair of suspension arms carrying said belt pickup, each said suspension arm pivotally coupled with a respective said frame end;
    a pair of lower travel limit linkages, each said lower travel limit linkage interconnected between a corresponding said frame end and said transfer belt assembly a pair of compression springs, each said compression spring positioned between a respective said suspension arm and corresponding said frame end, each said compression spring vertically supporting said respective suspension arm; and a pair of fluid shocks for damping movement, each said fluid shock connected with a corresponding said frame end and associated with a corresponding said suspension arm, said shocks substantially damping movement between the range of movement of said suspension arm.

11. The belt pickup header of claim 10, wherein each said fluid shock is connected with said transfer belt assembly and a respective said suspension arm.

12. The belt pickup header of claim 11, wherein each said fluid shock comprises a hydraulic shock.

13. The belt pickup header of claim 11, wherein each said fluid shock includes a ram defining an upper travel limit of said belt pickup.

14. The belt pickup header of claim 10, wherein each said compression spring comprises one of an air spring, a coil spring and a hydraulic spring.

15. The belt pickup header of claim 14, wherein each said compression spring comprises an air spring including a bladder coupled with a pair of end plates, one said end plate engaged with said corresponding frame end, and an other said end plate coupled with said corresponding suspension arm.

16. The belt pickup header of claim 15, wherein each said air spring includes an air valve.

17. The belt pickup header of claim 14, wherein each said compression spring vertically supports said corresponding suspension arm at a selected height.

18. The belt pickup header of claim 17, wherein each said compression spring is adjustable.

* * * * *